(12) United States Patent
Dumont et al.

(10) Patent No.: US 6,212,326 B1
(45) Date of Patent: Apr. 3, 2001

(54) VIDEO TAPE OR CASSETTE RECORDER

(75) Inventors: Frank Dumont; Chee Lam Tan, both of Singapore (SG)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/204,727

(22) Filed: Dec. 3, 1998

(30) Foreign Application Priority Data

Dec. 11, 1997 (GB) .................................................. 9726252

(51) Int. Cl.[7] .......................................................... H04N 5/76
(52) U.S. Cl. .................................................................. 386/46
(58) Field of Search ............................. 386/46, 94, 112; 348/705, 730; H04N 5/76

(56) References Cited

U.S. PATENT DOCUMENTS

| 4,831,449 | 5/1989 | Kimura . | |
|---|---|---|---|
| 5,523,851 | * 6/1996 | Leshem | 386/46 |
| 5,570,198 | * 10/1996 | Cho | 386/46 |
| 5,634,798 | 6/1997 | Suh . | |
| 5,666,555 | 9/1997 | Okazaki et al. . | |
| 5,887,112 | * 3/1999 | Geild | 386/46 |

FOREIGN PATENT DOCUMENTS 0742669A   11/1996   (EP) .............................. H04N/7/088

* cited by examiner

*Primary Examiner*—Huy Nguyen
(74) *Attorney, Agent, or Firm*—Joseph S. Tripoli; Robert D. Shedd

(57) ABSTRACT

A VCR is connectable to a television receiver and a decoder of scrambled signal. The VCR provides connection paths for coupling a video signal and an audio signal between the television receiver and the decoder. The VCR receives a control signal from the decoder indicating whether the video signal received by the television receiver is scrambled. In a first stand-by mode of the VCR, if the video signal is not scrambled, only the video signal is routed to the decoder through the VCR. If a scrambled signal is received, then the audio signal is also routed to the decoder through the VCR.

3 Claims, 2 Drawing Sheets

VIDEO TAPE OR CASSETTE RECORDER

FIELD OF THE INVENTION

The invention is in the field of VCR. (Video Tape or Cassette Recorder)

BACKGROUND OF THE INVENTION

In all electronic appliances efforts are made to reduce power consumption, in particular when the appliance is, in what is known as a stand-by mode. Stand-by mode is a mode in which the appliance is off, except a receiving circuit which is to receive an infrared reset signal, for instance, from a remote control box.

In the case of a VCR which is permanently connected to a decoder and a TV, the TV may be ON while the VCR and the decoder are in a stand-by mode. This state last as long as the user does not switch to a channel in which the video signal is transmitted in a scrambled way. If the user switches to a scrambled channel then the decoder has to be turned ON. The change to be made at the level of the decoder transit through the VCR, the VCR being in stand-by mode. More precisely, The video signal from the TV enters the VCR via a first pin of a first connection generally known as scart 1 which is at the rear of the VCR, and leaves the VCR toward the decoder, via a first pin of a second connection known as scart 2 which is also at the rear of the VCR. The decoder will detect whether the received signal is a scrambled signal. If the received signal is detected to be a scrambled one, a microprocessor in the decoder will set a second pin of scart 2 to high. A microprocessor in the VCR which has a routine to check the level of the second pin of scart 2, will receive the information. When the second pin is detected high, the routine will set a second pin of scart 1 to high. The unscrambled video signal from the decoder re-enters the VCR via a third pin of scart 2 and leaves the VCR via a third pin of scart 1 back to the TV. This signal loop from TV to decoder via VCR is made possible by switches of the VCR which are under the control of the microprocessor in the VCR.

The purpose of the invention is to reduce the power consumption of the VCR, while the VCR is in stand-by mode and connected via its scarts 1 and 2 to a decoder (or any other devices which have scart connection) and to a TV receiver.

BRIEF SUMMARY OF THE INVENTION

The invention stems from the fact that the inventors realised that the decoder needs only to receive the video signal and not the audio signal to detect that the received TV signal is a scrambled one. Taking this fact into account, the routine of the microprocessor has been modified. According to the invention, audio switch is turned off when the VCR is in what is now called an "eco" stand-by mode. "Eco" stands for "ecology". To sum up, the invention is about a video cassette recorder (VCR) connectable to a television receiver through a first connection, said connection having at least five pins, a first one to receive a video signal coming from a television receiver, a second one to output an unscrambled video signal toward the television receiver, a third one to receive an audio signal from the television receiver, a fourth one to output an unscrambled audio signal toward the television receiver and a fifth one to output control signal from a microprocessor of the VCR, said VCR being also connectable to a decoder of scrambled signal through a second connection, said second connection having at least five pins, a first one to output video signal received on first pin of said first scart toward the decoder, a second one to input said unscrambled video signal from the decoder, a third one to output toward the decoder said audio signal received on said third pin of said first scart from the television receiver, a fourth one to input an unscrambled audio signal from said decoder, and a fifth one to input a control signal coming from the decoder toward the microprocessor of the VCR, the input and output video signal passing through a first controllable video switch under control of the microprocessor, the input and output audio signal passing through a second controllable audio switch under control of the microprocessor of the VCR wherein in a first stand by mode called eco1 mode, only the first video switch is settled to ON, and wherein after reception of a control signal on the fifth pin of said second scart, an order is sent to switch on said second switch, and a control signal is sent toward the fifth pin of first scart, the function of said signal being to trigger a control in the television receiver to indicate that a video signal is available at the second pin of first scart

BRIEF DESCRIPTION OF THE DRAWINGS

A detailed embodiment of the invention will now be described with reference to the appended drawings in which.

DETAILED DESCRIPTION OF AN EMBODIMENT OF THE INVENTION

Figure 1:
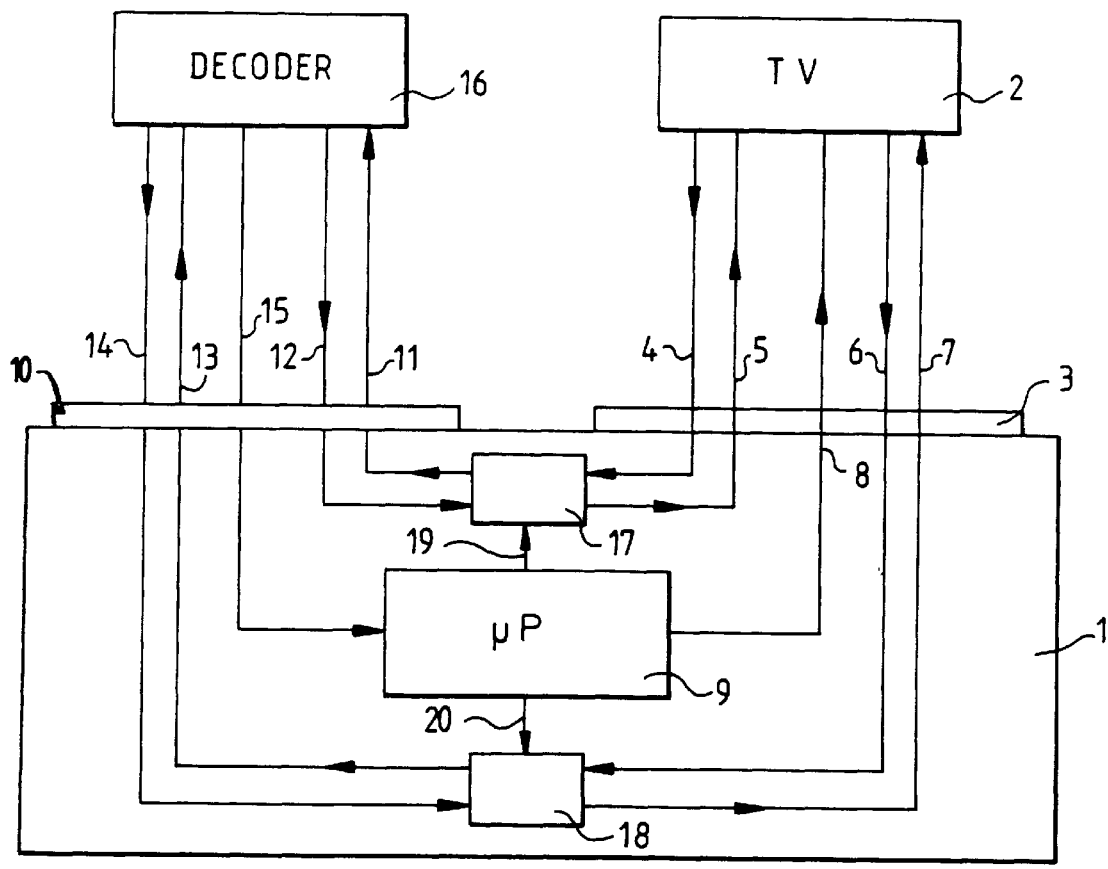
FIG. 1 is a schematic diagram of a VCR according to the invention. Said VCR being connected to a decoder and to a television receiver that are not part of the invention.

FIG. 1 represents a VCR 1. In the VCR, only the circuits that are necessary to understand the invention have been presented in a schematic form. The VCR 1 is connected to a television receiver 2 by means of a first connection scart 3, and to a decoder 16 by means of a second connection scart 10. Such scarts are well known in the art. They comprise several pins or terminals, each having a well known function. For the purpose of understanding the invention, only five of those terminals will be considered. VCR 1 comprises a microprocessor 9 which controls a video switch 17 and an audio switch 18 via control lines 19 and 20 respectively. A first terminal 4 of scart 3 is for receiving a video signal coming from the TV 2. Said video signal may be routed to the decoder through switch 17 and a first pin 11 of scart 10 if switch 17 is turned ON. Likewise, an unscrambled video signal may be travelling from a second pin 12 of scart 10 to a second pin 5 of scart 3 via switch 17. A third pin 6 of scart 3 is for receiving an audio signal coming from the TV 2. Said audio signal may be routed to the decoder through switch 18 and a third pin 13 of scart 10 if switch 18 is turned ON. In the same manner, an unscrambled audio signal may be travelling from a fourth pin 14 of scart 10 to a fourth pin 7 of scart 3 via switch 18. A control signal may be sent via a fifth pin 15 of scart 10, from the decoder to the microprocessor 9. Similarly, a control signal may be sent from microprocessor 9 to the TV 2 through a fifth pin 8 of scart 3.

Before explaining the operation of the invention, it should be understood that receiver 2 is ON and tuned to a transmitting station, and that the VCR which is connected to the television receiver 2 and to the decoder 16 is supposed to be in a first stand-by mode, known as ECO1 stand-by mode. In this mode, as explained above, the audio switch 18 is off, the video switch 17 is ON, so that only the video signal coming from the TV 2 is travelling toward the decoder through pin 4, switch 17 and pin 11 of scart 10. Said video signal input at pin 4 may be a scrambled or an unscrambled signal. The decoder is fitted with a circuit allowing the decoder to detect whether the incoming video signal is scrambled or unscrambled. If the signal received by the decoder 16 is detected as an unscrambled signal, then nothing will happen. If the incoming video signal is detected as a scrambled signal, the microprocessor of the decoder 16 will detect it. Said detection will trigger first the decoder to deliver a decoder control signal toward the VCR. Generally it is sufficient to set pin 15 from low to high. Said control signal is received on the fifth pin 15 of the second scart 10. The incoming control signal is sent to the internal microprocessor 9 of the VCR. On reception of this control signal, microprocessor 9 will issue a VCR control signal toward the television receiver 2. Generally, this is done by setting pin 8 from low to high. It will also turn ON audio switch 18, which according to the invention, is OFF in the first stand-by mode (ECO1). This second stand-by mode, in which audio switch 18 is ON and where pins 15 and 8 are set to high is called ECO2 mode. The VCR control signal is delivered to the television receiver via the fifth pin 8 of scart 3. Said VCR control signal will indicate to the receiver 2 that the incoming video signal that is to be displayed is available at the second pin 5 of scart 3, and that the audio signal to be sent to the loudspeaker of the receiver 2 is the unscrambled signal coming from pin 7 of scart 3. Pins 15 and 8 will stay at high and the VCR will be in ECO2 stand-by mode for as long as the signal received by the decoder 16 through the VCR is a scrambled signal. If the received signal becomes unscrambled or if no signal is received anymore, for instance because the receiver 2 has been turned OFF, decoder 16 will turn pin 15 to low again and ECO1 mode of the VCR will be resumed. The power consumption is about 3W in ECO1 mode, and about 4W in ECO2 mode.

It has been presented schematically in FIG. 1 that audio switch 18 is under the control of microprocessor 9 through a control line 20. An example of a control circuit using control line 20 to able and disable switch 18 is shown in FIG. 2.

Switch 18 is included in an audio circuit 21 supplied by a 14 volts direct current source 22. A circuit 23, represented in dotted line, is added to the VCR in order to supply the said direct current source 22 to audio circuit 21 according to the level of an output 24 of microprocessor 9. The said circuit 23 has two inputs, a first 25 to input the level of output 24 of microprocessor 9, and a second to input the direct voltage coming from source 22. Circuit 23 has an output 27 to supply or not said voltage to an input 28 of audio circuit 21. In the embodiment presented in FIG. 2, when output 24 is high, then current is supplied to input 28. If output 24 is low, then no current is supplied to input 28. Circuit 23 comprises mainly two transistors, a first 29, which is a NPN transistor, and a second 33, which is a PNP transistor. Transistor 29 has a base 30 connected to input 25 of control circuit 23, an emitter 31, connected to a reference voltage, and a collector 32 coupled to the base 34 of transistor 33. An emitter 35 of transistor 33 is coupled to input 26 receiving the direct current voltage of source 22. Collector 36 of transistor 33 is coupled to output 27.

The circuit 23, known per se, works as follows. If the base 30 of transistor 29 is high, that means if output 24 of microprocessor 9 is high, transistor 29 is conducting and so base 34 of transistor 33 is low. That means that output 27 delivers voltage of source 22 through the emitter collector path of transistor 33.

Figure 2:
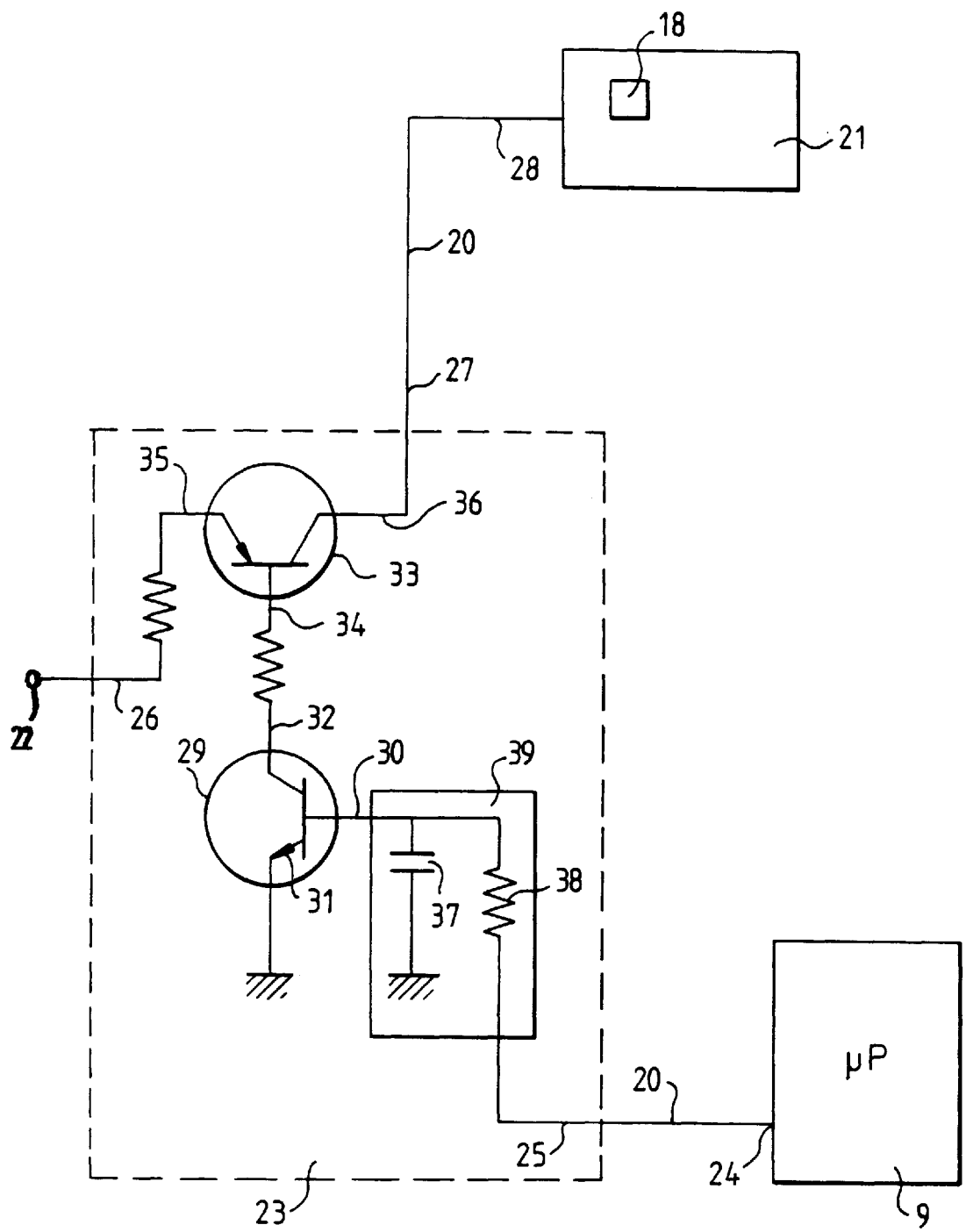
FIG. 2 is an example of a control circuit to switch ON and OFF an audio switch in a VCR according to the invention.

In the schematic presented in FIG. 2, base 30 is fed high through an integrating R, C circuit 39 made of a capacitor 37 and a resistor 38. This is to slow down the transition between ECO1 and ECO2 or normal stand-by modes to stay within the handling capacity of a power supply (not shown) feeding among others power source 22.

What is claimed is:

1. Videocassette recorder (VCR) connectable to a television receiver through a first connection which has at least five pins, a first one to receive a video signal coming from a television receiver, a second one to output an unscrambled video signal toward the television receiver, a third one to receive an audio signal from the television receiver, a fourth one to output an unscrambled audio signal toward the television receiver and a fifth one to output a control signal from a microprocessor of the VCR, the VCR being also connectable to a decoder through a second connection which has at least five pins, a first one to output a video signal received on first pin of said first connection toward the decoder, a second one to input said unscrambled video signal from the decoder, a third one to output toward the decoder said audio signal received on said third pin of said first connection, a fourth one to input an unscrambled audio signal from said decoder, and a fifth one to input a control signal coming from the decoder toward the microprocessor of the VCR, the input and output video signal passing through a first controllable switch under the control of the microprocessor, the input and output audio signal passing through a second controllable switch under the control of the microprocessor of the VCR via a control line, wherein in a first stand-by mode, only the first controllable switch is switched ON, and wherein after reception of a control signal on the fifth pin of said second connection, a command is sent via said control line between the microprocessor and said second controllable switch to switch ON said second controllable switch, whereby the VCR is in a second stand-by mode, and a control signal is sent toward the fifth pin of the first connection to indicate to the television receiver that the video signal to be displayed is available at the second pin of the first connection.

2. VCR according to claim 1 wherein said control line between the microprocessor of the VCR and said second controllable switch comprises a control circuit having a first input coupled to an output of the microprocessor of the VCR, a second input coupled to a direct current source and an output coupled to said second controllable switch, whether said source is connected to said output depending upon the level of a voltage at the first input of said control circuit.

3. VCR according to claim 2 wherein said control circuit comprises an R, C integrating circuit to slow down a transition between the first stand-by mode and the second stand-by mode to stay within the handling capacity of a power supply.

* * * * *